United States Patent
Chang

(10) Patent No.: US 12,136,161 B2
(45) Date of Patent: Nov. 5, 2024

(54) METHOD OF PROCESSING INFORMATION, METHOD OF RENDERING IMAGE, AND ELECTRONIC DEVICE

(71) Applicant: Beijing Baidu Netcom Science Technology Co., Ltd., Beijing (CN)

(72) Inventor: Yanlong Chang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 143 days.

(21) Appl. No.: 17/899,334

(22) Filed: Aug. 30, 2022

(65) Prior Publication Data

US 2022/0414971 A1 Dec. 29, 2022

(30) Foreign Application Priority Data

Sep. 18, 2021 (CN) .......................... 202111103709.0

(51) Int. Cl.
*G06T 1/20* (2006.01)
*G06F 8/34* (2018.01)
*G06F 8/65* (2018.01)
*G06T 15/00* (2011.01)

(52) U.S. Cl.
CPC .............. *G06T 15/005* (2013.01); *G06F 8/34* (2013.01); *G06F 8/65* (2013.01)

(58) Field of Classification Search
CPC ..... G06T 1/20; G06T 2200/16; G06T 15/005; G06T 19/00; G06F 2209/541; G06F 8/34; G06F 8/65; G09G 2360/16; G09G 2370/04; G09G 5/363
See application file for complete search history.

(56) References Cited

U.S. PATENT DOCUMENTS

| | | | |
|---|---|---|---|
| 2018/0345140 A1* | 12/2018 | Posin | A63F 13/21 |
| 2019/0051034 A1 | 2/2019 | Urbach | |
| 2019/0205147 A1* | 7/2019 | Huang | G06F 3/1454 |
| 2021/0029340 A1* | 1/2021 | Wu | H04N 13/122 |

FOREIGN PATENT DOCUMENTS

| | | |
|---|---|---|
| CN | 110727434 | 1/2020 |
| CN | 111324376 | 6/2020 |
| CN | 113313804 | 8/2021 |

OTHER PUBLICATIONS

Chinese First Office Action, issued in the corresponding Chinese patent application No. 202111103709.0, dated May 27, 2022, 6 pages.
Extended European Search Report, issued in the corresponding European patent application No. 22193952.3, dated Jan. 26, 2023, 14 pages.

* cited by examiner

*Primary Examiner* — Hau H Nguyen
(74) *Attorney, Agent, or Firm* — HSML P.C.

(57) ABSTRACT

The present disclosure provides a method of processing an information, a method of rending an image, and an electronic device. A specific implementation solution may include: acquiring a target image obtained by rendering, wherein the target image contains one or more target parameter information corresponding to one or more rendering indexes respectively; generating a rendering code according to the target parameter information of the target image, wherein the rendering code is for rendering an image to be rendered; and transmitting the rendering code to a second electronic device.

14 Claims, 6 Drawing Sheets

METHOD OF PROCESSING INFORMATION, METHOD OF RENDERING IMAGE, AND ELECTRONIC DEVICE

CROSS-REFERENCE TO RELATED APPLICATION(S)

This application claims the priority of Chinese Patent Application No. 202111103709.0, filed on Sep. 18, 2021, the entire contents of which are hereby incorporated by reference.

TECHNICAL FIELD

The present disclosure relates to a field of a computer technology, in particular to a field of cloud computing, for example, to a field of media cloud.

BACKGROUND

At present, mobile phones, computers, photographic devices, etc. may support operations such as image acquisition and image processing. An operation of processing an image includes but is not limited to an operation of rendering the image. In a related art, a user may generally adjust a relevant image processing software manually to render the image.

SUMMARY

The present disclosure provides a method of processing an information, a method of rending an image, an electronic device, and a readable storage medium.

According to an aspect of the present disclosure, there is provided a method of processing an information, applied to a first electronic device, the method including: acquiring a target image obtained by rendering, wherein the target image contains one or more target parameter information corresponding to one or more rendering indexes respectively; generating a rendering code according to the target parameter information of the target image, wherein the rendering code is for rendering an image to be rendered; and transmitting the rendering code to a second electronic device.

According to another aspect of the present disclosure, there is provided a method of rendering an image, applied to a second electronic device, the method including: acquiring a rendering request, wherein the rendering request requests to render an image to be rendered; executing a rendering code in response to the rendering request, so as to render the image to be rendered, wherein the rendering code is obtained by a first electronic device by: acquiring a target image obtained by rendering, wherein the target image contains one or more target parameter information corresponding to one or more rendering indexes respectively; and generating the rendering code according to the target parameter information of the target image.

According to another aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method described above.

According to another aspect of the present disclosure, there is provided a non-transitory computer-readable storage medium having computer instructions therein, wherein the computer instructions are configured to cause a computer to implement the method described above.

Through embodiments of the present disclosure, the rendering code is generated according to the target parameter information corresponding to various rendering indexes of the target image, and the rendering code is transmitted to other electronic devices, so that the other electronic devices may quickly generate a rendered image with a desired effect, which simplifies a user's operation process, and achieves relatively consistent rendering effects when rendering the image through various electronic devices.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In a related art, in order to obtain a satisfactory image, an initial image may generally be processed manually by using related software. For example, a toning operation may be performed on the initial image by using drawing software, so as to obtain a rendered image with satisfactory colors.

In a process of achieving the present disclosure, it is found that a user needs to manually edit functional parameters in the related software multiple times in order to achieve a satisfactory operation effect. For images obtained under similar or the same image acquisition condition, various effects may be achieved by various users editing images using various electronic devices.

Embodiments of the present disclosure provide a method of processing an information, applied to a first electronic device. In the method, a target image obtained by rendering is acquired, the target image contains one or more target parameter information corresponding to one or more rendering indexes respectively; a rendering code is generated according to the target parameter information of the target image, the rendering code is for rendering an image to be rendered; and the rendering code is transmitted to a second electronic device. This enables the second electronic device to quickly generate a rendered image with a desired effect, so that the user's operation process is simplified, and relatively consistent rendering effects may be achieved when rendering the image through various electronic devices.

In the technical solution of the present disclosure, an acquisition, a storage, an application, a processing, a transmission, a provision and a disclosure of user personal information involved comply with provisions of relevant laws and regulations, and do not violate public order and good custom.

Figure 1:
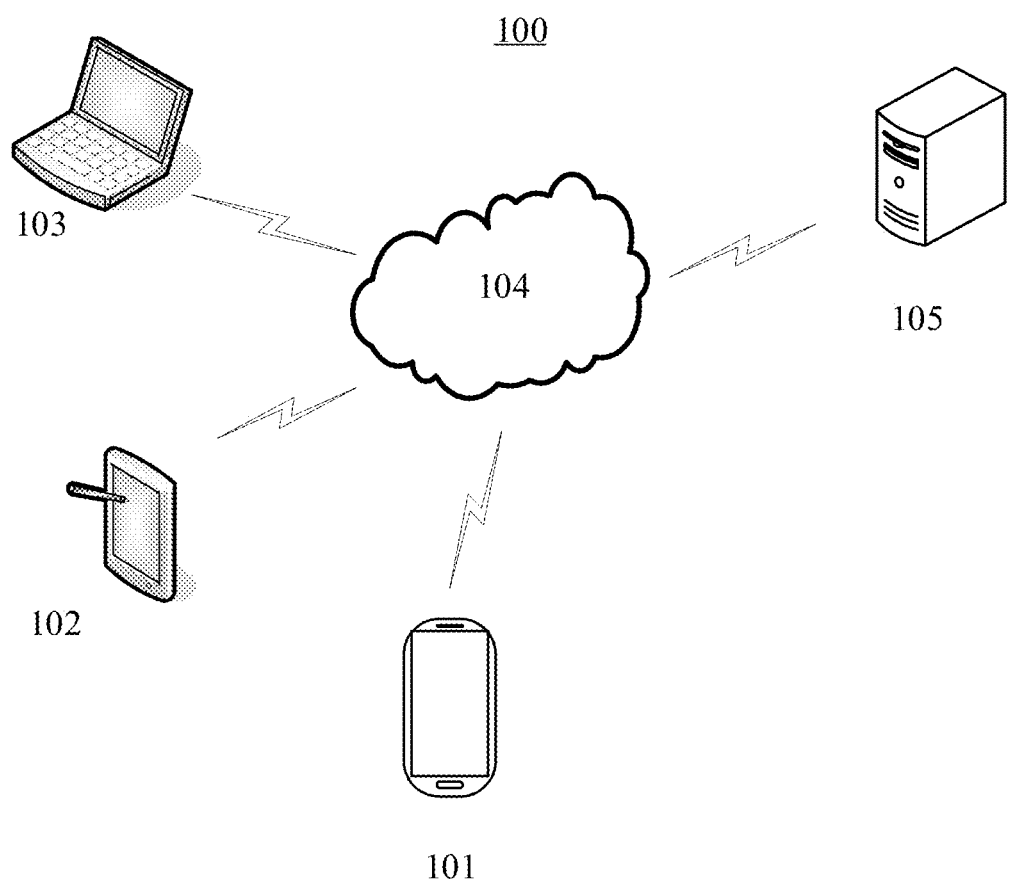
FIG. 1 schematically shows an exemplary system architecture in which a method and an apparatus of processing an information, an electronic device and a readable storage medium may be applied according to embodiments of the present disclosure.

FIG. 1 schematically shows an exemplary system architecture in which a method and an apparatus of processing an information, an electronic device and a readable storage medium may be applied according to embodiments of the present disclosure. It should be noted that FIG. 1 is only an example of the system architecture in which embodiments of the present disclosure may be applied to help those skilled in the art understand the technical content of the present disclosure, but it does not mean that embodiments of the present disclosure may not be applied to other devices, systems, environments or scenarios.

As shown in FIG. 1, a system architecture 100 according to this embodiment may include terminal devices 101, 102, 103, a network 104, and a server 105. The network 104 is a medium for providing a communication link between the terminal devices 101, 102, 103 and the server 105. The network 104 may include various connection types, such as wired and/or wireless communication links, and the like.

The user may use the terminal devices 101, 102, 103 to interact with the server 105 through the network 104 to receive or send messages, etc. Various client applications may be installed on the terminal devices 101, 102 and 103, such as multimedia file output applications, image processing applications, image management applications, web browser applications, search applications, instant messaging tools, mailbox clients and/or social platform software (only examples).

The terminal devices 101, 102 and 103 may be various electronic devices having display screens and supporting web browsing, including but not limited to smart phones, tablet computers, laptop computers, desktop computers, etc.

The server 105 may be a server that provides various services, such as a background server that provides storage, computing, and other functions for the terminal devices 101, 102, 103 (only an example). The background management server may analyze and process a received user request and other data, and feed back a processing result (such as web pages, information, or data acquired or generated according to the user request) to the terminal device.

According to embodiments of the present disclosure, taking the terminal device 101 as the first electronic device as an example, the second electronic device may be the terminal device 102, the terminal device 103, or may be the server 105.

According to embodiments of the present disclosure, the terminal device 101 may generate a rendering code according to the target parameter information of the target image, and then transmit the rendering code to the terminal device 102 and/or the terminal device 103. Alternatively, the terminal device 101 may transmit the rendering code to the server 105, and the server 105 transmits the rendering code to the terminal device 102 and/or the terminal device 103.

It should be understood that the number of terminal devices, network and server in FIG. 1 is only schematic. According to implementation needs, any number of terminal devices, networks and servers may be provided.

Figure 2:
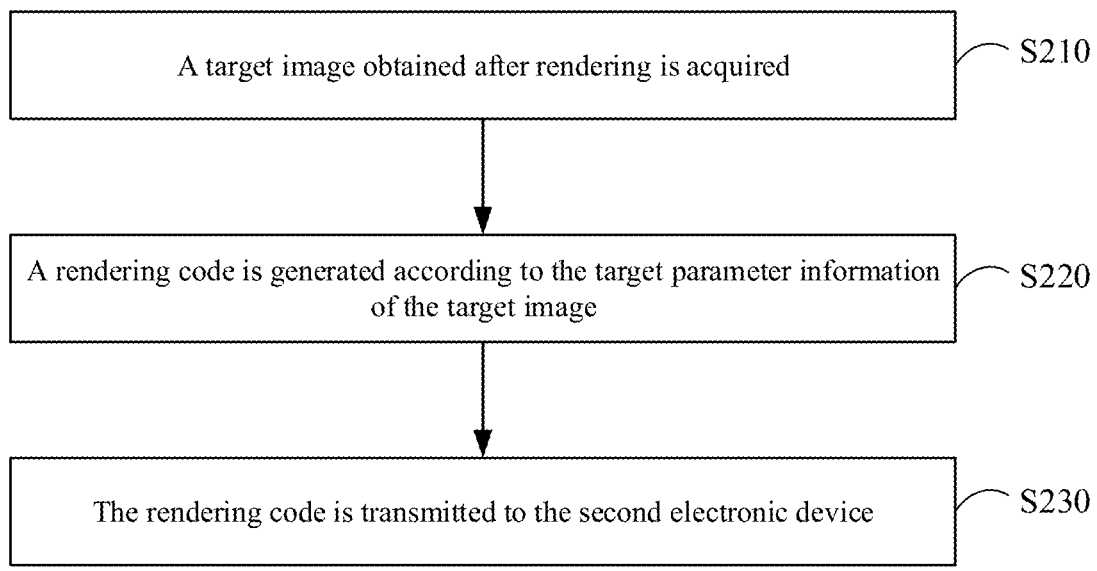
FIG. 2 schematically shows a flowchart of a method of processing an information according to embodiments of the present disclosure.

FIG. 2 schematically shows a flowchart of a method of processing an information according to embodiments of the present disclosure.

According to embodiments of the present disclosure, the method of processing the information may be performed by the first electronic device. As shown in FIG. 2, a method 200 of processing an information includes operations S210 to S230.

In operation S210, a target image obtained after rendering is acquired, and the target image contains one or more target parameter information corresponding to one or more rendering indexes respectively.

In operation S220, a rendering code is generated according to the target parameter information of the target image, and the rendering code is for rendering an image to be rendered.

In operation S230, the rendering code is transmitted to the second electronic device.

According to embodiments of the present disclosure, the target image obtained after rendering may be obtained by rendering an initial image at a local end of the first electronic device. The target image obtained after rendering may also be obtained by rendering the initial image on other electronic devices, and then the target image obtained after rendering may be transmitted by other electronic devices to the first electronic device.

According to embodiments of the present disclosure, acquiring the target image obtained after rendering may include acquiring the target image itself. By analyzing the acquired target image, one or more target parameter information corresponding to one or more rendering indexes may be determined.

According to embodiments of the present disclosure, acquiring the target image obtained after rendering may include acquiring one or more target parameter information corresponding to one or more rendering indexes of the target image respectively. By acquiring the target parameter information, a network consumption between the other electronic devices and the first electronic device may be reduced.

According to embodiments of the present disclosure, acquiring the target image obtained after rendering may include acquiring the target image itself and the target parameter information corresponding to one or more rendering indexes of the target image respectively.

According to embodiments of the present disclosure, the first electronic device and/or the other electronic devices may be provided with a rendering platform through which an input initial image may be rendered.

According to embodiments of the present disclosure, a type of the rendering index is not limited. For example, the rendering index may include, but not be limited to at least one of saturation, contrast, exposure, chroma and texture.

According to embodiments of the present disclosure, the target parameter information corresponding to each rendering index may be an index value or an index type. For example, the target parameter information corresponding to saturation may be a saturation value, the target parameter information corresponding to chroma may be a chroma value, and the target parameter information corresponding to texture may be a texture type.

According to embodiments of the present disclosure, the rendering code may be automatically generated according to the target parameter information of the target image by using a code generation tool. The rendering code may contain the target parameter information corresponding to various rendering indexes. The rendering code may also contain the target image or a storage address of the target image, and so on.

According to embodiments of the present disclosure, the first electronic device may further transmit the target image to the second electronic device, so that the second electronic device may associate the rendering code with the target image. Before rendering the initial image using the second electronic device, the user may preview a rendering effect according to the displayed target image, so as to determine whether to render the initial image by using the rendering code.

Through embodiments of the present disclosure, the rendering code is generated according to the target parameter information corresponding to various rendering indexes of the target image, and the rendering code is transmitted to other electronic devices, so that the other electronic devices may quickly generate a rendered image with a desired effect, which may simplify the user's operation process, and achieve relatively consistent rendering effects when rendering the image through various electronic devices.

The method shown in FIG. 2 is further described below with reference to FIG. 3 to FIG. 6 in combination with specific embodiments.

Figure 3:
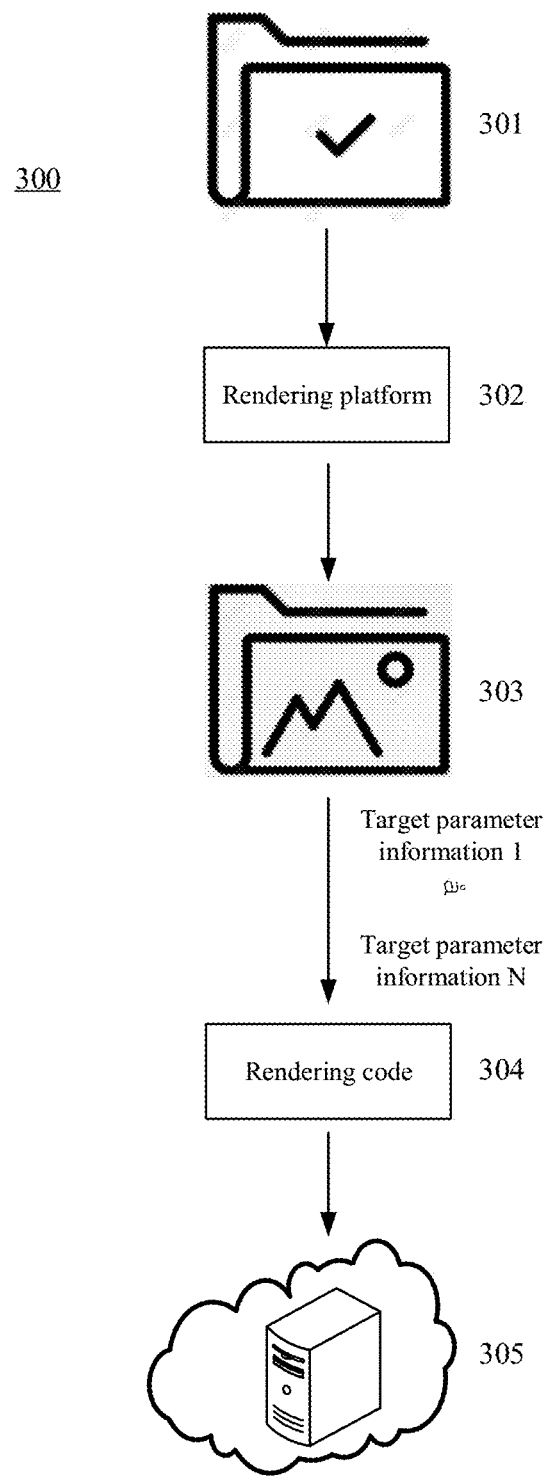
FIG. 3 schematically shows a scene diagram of a method of processing an information according to embodiments of the present disclosure.

FIG. 3 schematically shows a scene diagram of a method of processing an information according to embodiments of the present disclosure.

As shown in FIG. 3, in a scene diagram 300, an initial image 301 not rendered is input to a rendering platform 302. The initial image 301 may be rendered on the rendering platform 302. For example, a toning operation, including but not limited to an adjustment of lightness, brightness, contrast, etc. may be performed on the initial image 301.

According to embodiments of the present disclosure, the rendering platform 302 may include one or more of an HSV model, an HSL model and an RGB model, and these models may be used to perform a filter toning on the input initial image 301. The rendering platform 302 may be, for example, an IO program based on Shader toning.

According to embodiments of the present disclosure, a target image 303 may be obtained after the initial image 301 is rendered. The target image 303 may include one or more target parameter information corresponding to one or more rendering indexes respectively, for example, target parameter 1 to target parameter N.

According to embodiments of the present disclosure, a rendering code 304 that may achieve a related rendering effect may be generated according to the target parameter 1 to the target parameter N. According to embodiments of the present disclosure, a method of generating the rendering code is not limited, which may include but not be limited to, for example, matching and developing a corresponding rendering code by developers, or automatically generating a corresponding rendering code by using code generation tools.

According to embodiments of the present disclosure, after the rendering code 304 is generated, the rendering code 304 may be transmitted to the second electronic device.

According to embodiments of the present disclosure, when the second electronic device is a cloud device, the rendering code 304 may be transmitted to a cloud device 305. The rendering code 304 may be stored in the cloud device 305, and a third electronic device may request the rendering code 304 from the cloud device 305.

According to embodiments of the present disclosure, after the rendering code 304 is generated, the rendering code 304 may also be directly transmitted to other electronic devices.

Figure 4:
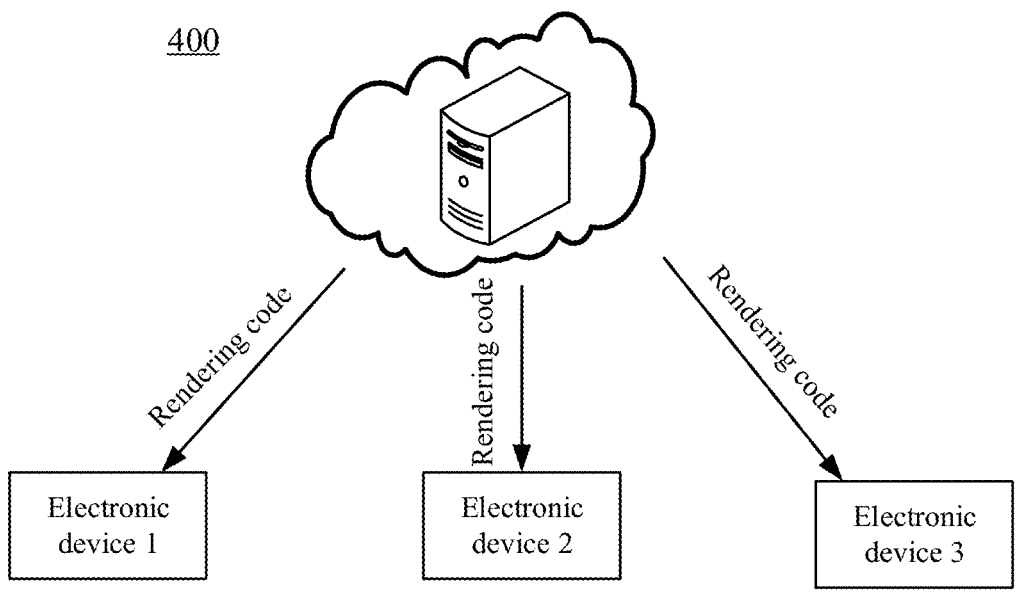
FIG. 4 schematically shows a scene diagram of acquiring a rendering code through a cloud device according to embodiments of the present disclosure.

FIG. 4 schematically shows a scene diagram of acquiring the rendering code through a cloud device according to embodiments of the present disclosure.

As shown in FIG. 4, in a scene diagram 400, the cloud device may transmit the obtained rendering code to the third electronic device, such as an electronic device 1, an electronic device 2, an electronic device 3, and so on.

According to embodiments of the present disclosure, the cloud device may receive a hot update request from the third electronic device, and transmit the rendering code to the third electronic device in response to the hot update request. The third electronic device may synchronously update the rendering code acquired from the cloud device and directly store the rendering code locally for scene applications such as filter effects.

According to embodiments of the present disclosure, the third electronic device may transmit the hot update request to the cloud device by means of periodic polling. Upon finding a new rendering code in the cloud device, the cloud device may distribute the new rendering code to the corresponding third electronic device.

According to embodiments of the present disclosure, a frequency or period of the periodic polling is not limited. For example, the hot update request may be transmitted to the cloud device in unit of hours, such as every few hours.

According to embodiments of the present disclosure, the cloud device may also automatically transmit an update notification to the third electronic device to prompt the third electronic device that there is a new rendering code for update.

According to embodiments of the present disclosure, rendering codes from various electronic devices may be stored in the cloud device, and each rendering code may achieve one or more rendering effects.

Through embodiments of the present disclosure, there is provided a rendering code sharing mechanism that may achieve various rendering effects, in which the local device that generates the rendering code may upload the rendering code to the cloud device, and the device that requests to acquire the rendering code may request the rendering code from the cloud device, so that the rendering code may be shared, and a user experience may be improved.

Figure 5:
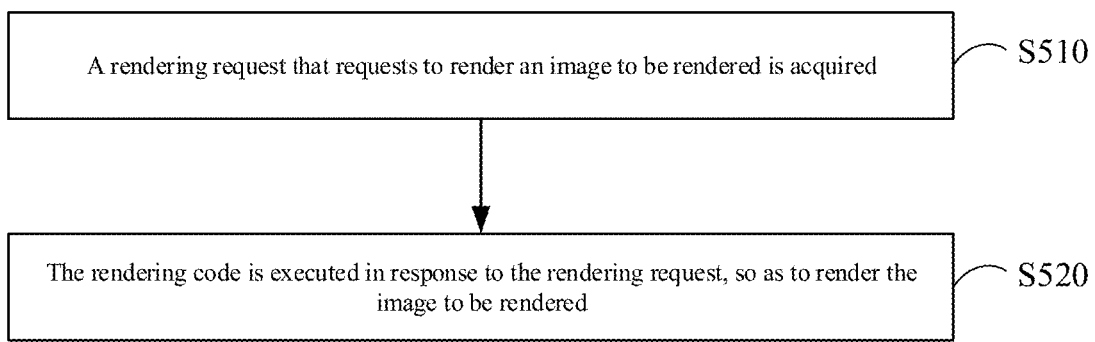
FIG. 5 schematically shows a flowchart of a method of rendering an image according to embodiments of the present disclosure.

FIG. 5 schematically shows a flowchart of a method of rendering an image according to embodiments of the present disclosure.

According to embodiments of the present disclosure, there is provided a method of rendering an image, applied to a second electronic device. As shown in FIG. 5, a method 500 of rendering an image includes operations S510 to S520.

In operation S510, a rendering request that requests to render an image to be rendered is acquired.

In operation S520, the rendering code is executed in response to the rendering request, so as to render the image to be rendered. The rendering code is obtained by the first electronic device by: acquiring a target image obtained by rendering, and the target image contains one or more target parameter information corresponding to one or more rendering indexes respectively; and generating the rendering code according to the target parameter information of the target image.

According to embodiments of the present disclosure, the rendering code generated by the first electronic device may be pre-acquired by the second electronic device.

According to embodiments of the present disclosure, the second electronic device may be a cloud device, or a mobile terminal device for a user operation.

According to embodiments of the present disclosure, when the user operates an image through the second electronic device, the second electronic device may generate a rendering request that requests to render the image to be rendered, in response to the user operation.

Through embodiments of the present disclosure, when the second electronic device needs to render the image to be rendered, the image to be rendered may be rendered using the rendering code generated by the first electronic device, so that the second electronic device may quickly generate a rendered image with a desired effect, which may simplify the user's operation process, and achieve relatively consistent rendering effects when rendering the image through various electronic devices.

Figure 6:
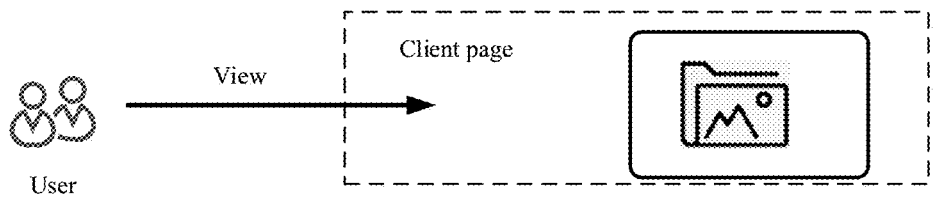
FIG. 6 schematically shows a scene diagram of rendering an image to be rendered using a second electronic device according to embodiments of the present disclosure.

FIG. 6 schematically shows a scene diagram of rendering an image to be rendered using the second electronic device according to embodiments of the present disclosure.

As shown in FIG. 6, in a scene diagram 600, a preview operation of the user may be acquired, and an effect preview obtained by rendering with the rendering code may be displayed on a client page. The user may view the effect preview to determine the rendering code used to render the image to be rendered.

In an example, it is difficult to achieve an alignment of rendering effects because a special effect quantization such as a color quantization, a brightness quantization, etc. and a linear change may be various on various development platforms. For example, a quantitative range of a webpage rendering index may be greatly different from a quantitative range of an Android rendering index.

According to embodiments of the present disclosure, generating the rendering code according to the target parameter information of the target image may include: normalizing the one or more target parameter information corresponding to the one or more rendering indexes respectively, so as to obtain a normalized parameter information corresponding to each of the rendering indexes; and generating the rendering code according to the normalized parameter information corresponding to each of the rendering indexes.

According to embodiments of the present disclosure, by normalizing the target parameter information respectively corresponding to various rendering indexes, dimensional scales of various rendering indexes may be unified, so that image rendering effects of various development platforms may be unified.

According to embodiments of the present disclosure, generating the rendering code according to the target parameter information of the target image may further include: determining an application program interface for rendering that is supported by various development platforms; and generating the rendering code according to the target parameter information of the target image based on the application program interface.

According to embodiments of the present disclosure, a common support characteristic of various platforms for graphics rendering is used, for example, various platforms may support graphics rendering of OpenGL (Open Graphics Library), so that a cross-platform and cross-language operation of the rendering code may be achieved.

Figure 7:
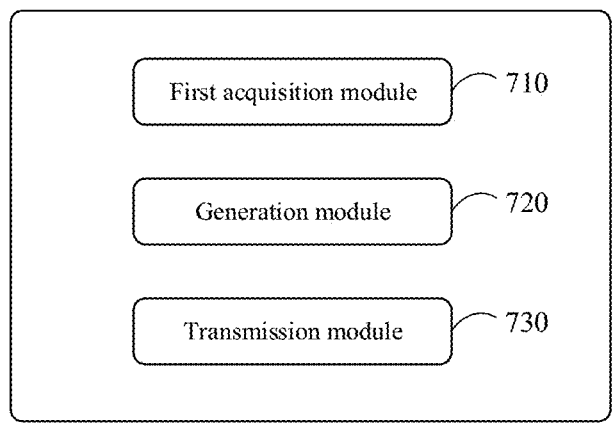
FIG. 7 schematically shows a block diagram of an apparatus of processing an information according to embodiments of the present disclosure.

FIG. 7 schematically shows a block diagram of an apparatus of processing an information according to embodiments of the present disclosure.

The apparatus of processing the information may be applied to the first electronic device. As shown in FIG. 7, an apparatus 700 of processing an information includes a first acquisition module 710, a generation module 720, and a transmission module 730.

The first acquisition module 710 is used to acquire a target image obtained after rendering. The target image contains one or more target parameter information corresponding to one or more rendering indexes respectively.

The generation module 720 is used to generate a rendering code according to the target parameter information of the target image. The rendering code is used to render an image to be rendered.

The transmission module 730 is used to transmit the rendering code to the second electronic device.

Through embodiments of the present disclosure, the rendering code is generated according to the target parameter information respectively corresponding to various rendering indexes of the target image, and the rendering code is transmitted to other electronic devices, so that the other electronic devices may quickly generate a rendered image with a desired effect, which may simplify the user's operation process, and achieve relatively consistent rendering effects when rendering the image through various electronic devices.

According to embodiments of the present disclosure, the second electronic device may include a cloud device, and the transmission module may be used to transmit the rendering code to the cloud device, so that a third electronic device is allowed to request the rendering code from the cloud device.

According to embodiments of the present disclosure, the generation module 720 may include a processing unit and a first generation unit.

The processing unit is used to normalize the target parameter information respectively corresponding to the one or more rendering indexes, so as to obtain a normalized parameter information corresponding to each of the rendering indexes.

The first generation unit is used to generate the rendering code according to the normalized parameter information corresponding to each of the rendering indexes.

According to embodiments of the present disclosure, the generation module 720 may include a determination unit and a second generation unit.

The determination unit is used to determine an application program interface for rendering that is supported by various development platforms.

The second generation unit is used to generate the rendering code according to the target parameter information of the target image based on the application program interface for rendering.

According to embodiments of the present disclosure, the rendering index may include at least one of saturation, contrast, exposure, chroma and texture.

Figure 8:
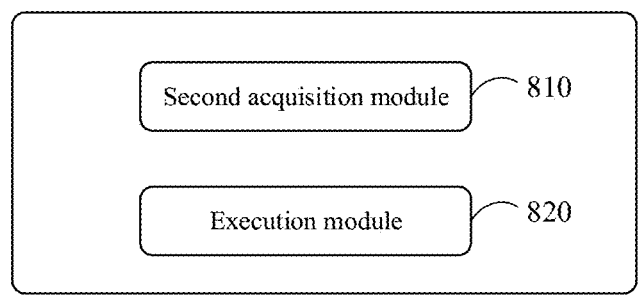
FIG. 8 schematically shows a block diagram of an apparatus of rendering an image according to embodiments of the present disclosure.

FIG. 8 schematically shows a block diagram of an apparatus of rendering an image according to embodiments of the present disclosure.

The apparatus of rendering the image may be applied to the second electronic device. As shown in FIG. 8, an apparatus 800 of rendering an image includes a second acquisition module 810 and an execution module 820.

The second acquisition module 810 is used to acquire a rendering request that requests to render an image to be rendered.

The execution module 820 is used to execute a rendering code in response to the rendering request, so as to render the image to be rendered. The rendering code may be obtained by the first electronic device by: acquiring a target image obtained by rendering, and the target image contains one or more target parameter information corresponding to one or more rendering indexes respectively; and generating the rendering code according to the target parameter information of the target image.

Through embodiments of the present disclosure, when the second electronic device needs to render the image to be rendered, the image to be rendered may be rendered using the rendering code generated by the first electronic device, so that the second electronic device may quickly generate a rendered image with a desired effect, which may simplify the user's operation process, and achieve relatively consistent rendering effects when rendering the image through various electronic devices.

According to embodiments of the present disclosure, when the second electronic device is a cloud device, the apparatus 800 of rendering the image may further include a second receiving module and a response module.

The second receiving module is used to receive a hot update request from the third electronic device.

The response module is used to transmit the rendering code to the third electronic device in response to the hot update request.

Any number of the modules, sub-modules, units and subunits according to embodiments of the present disclosure, or at least part of the functions of any number of them may be implemented in one module. Any one or more of the modules, sub-modules, units and subunits according to embodiments of the present disclosure may be split into multiple modules for implementation. Any one or more of the modules, sub-modules, units and subunits according to embodiments of the present disclosure may be implemented at least partially as a hardware circuit, such as a Field Programmable Gate Array (FPGA), a Programmable Logic Array (PLA), a System on Chip, a System on Substrate, a System on Package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub-modules, units and subunits according to embodiments of the present disclosure may be at least partially implemented as a computer program module that, when executed, may perform the corresponding functions.

For example, any plurality of the first acquisition module 710, the generation module 720 and the transmission module 730, or the second acquisition module 810 and the execution module 820, may be integrated into one module/unit/subunit for implementation, or any module/unit/subunit thereof may be split into a plurality of modules/units/subunits. Alternatively, at least part of functions of one or more of these modules/units/subunits may be combined with at least part of functions of other modules/units/subunits and implemented in one module/unit/subunit. According to embodiments of the present disclosure, at least one of the first acquisition module 710, the generation module 720 and the transmission module 730, or at least one of the second acquisition module 810 and the execution module 820 may be implemented at least partially as a hardware circuit, such as a Field Programmable Gate Array (FPGA), a Programmable Logic Array (PLA), a System on Chip, a System on Substrate, a System on Package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the first acquisition module 710, the generation module 720 and the transmission module 730, or at least one of the second acquisition module 810 and the execution module 820 may be at least partially implemented as a computer program module that, when executed, may perform the corresponding functions.

It should be noted that a portion of embodiments of the present disclosure for the apparatus of processing the information corresponds to a portion of embodiments of the present disclosure for the method of processing the information. For the description of the portion for the apparatus of processing the information, reference may be made to the portion for the method of processing the information, and details will not be described here. A portion of embodiments of the present disclosure for the apparatus of rendering the image corresponds to a portion of embodiments of the present disclosure for the method of rendering the image. For the description of the portion for the apparatus of rendering the image, reference may be made to the portion for the method of rendering the image, and details will not be described here According to embodiments of the present disclosure, the present disclosure further provides an electronic device, a readable storage medium, and a computer program product.

According to embodiments of the present disclosure, the electronic device may include: at least one processor; and a memory communicatively connected to the at least one processor. The memory stores instructions executable by the at least one processor, and the instructions, when executed by the at least one processor, cause the at least one processor to implement the method of processing the information as described above.

According to embodiments of the present disclosure, there is provided a non-transitory computer-readable storage medium having computer instructions therein. The computer instructions are used to cause a computer to implement the method of processing the information as described above.

According to embodiments of the present disclosure, the computer program product contains a computer program/instructions, and the computer program/instructions, when executed by a processor, causes/cause the processor to implement the method of processing the information as described above.

Figure 9:
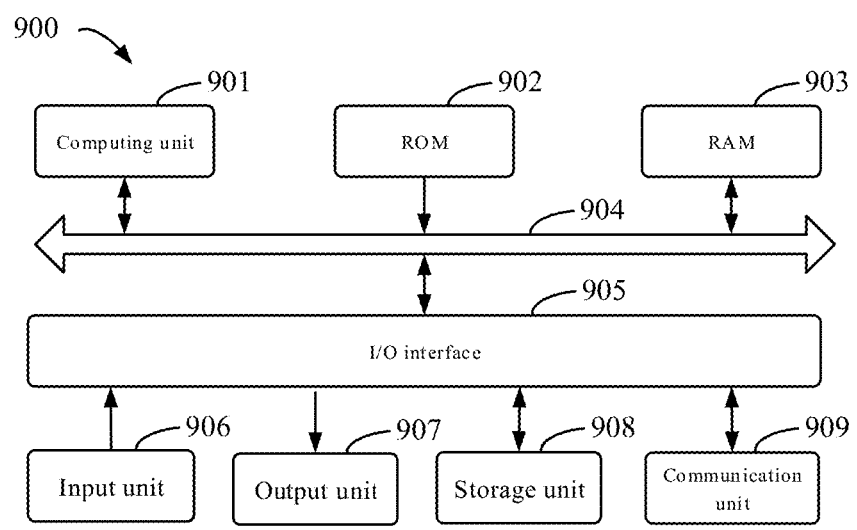
FIG. 9 schematically shows a schematic block diagram of an example electronic device for implementing embodiments of the present disclosure.

FIG. 9 shows a schematic block diagram of an exemplary electronic device 900 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or dedicated processing assemblies having processing and computing capabilities. Some examples of the computing units 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and processes described above, such as the method described above. For example, in some embodiments, the method described above may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method described above. Alternatively, in other embodiments, the computing unit 901 may be configured to perform the method described above by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, or may be a server of a distributed system or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing an information that is applied to a first electronic device, the method comprising:
   acquiring a target image obtained by rendering an initial image, wherein the target image comprises one or more target parameter information corresponding to one or more rendering indexes respectively, the one or more rendering indexes comprises at least one of saturation, contrast, exposure, chroma, and texture, and the one or more rendering indexes corresponding to the texture is a texture type;
   generating a rendering code according to the target parameter information of the target image, wherein the rendering code is for rendering an image to be rendered, and the rendering code comprises the one or more target parameter information corresponding to the one or more rendering indexes; and
   transmitting the rendering code to a second electronic device from the first electronic device, so that the second electronic device provides the rendering code to a third electronic device in response to a request from the third electronic device, wherein the second electronic device is a cloud device.

2. The method of claim 1, wherein the generating the rendering code according to the target parameter information of the target image comprises:
   normalizing the one or more target parameter information corresponding to the one or more rendering indexes respectively, so as to obtain a normalized parameter information corresponding to each of the one or more rendering indexes; and
   generating the rendering code according to the normalized parameter information corresponding to each of the on or more rendering indexes.

3. The method of claim 1, wherein the generating the rendering code according to the target parameter information of the target image comprises:
   determining an application program interface for rendering, wherein the application program interface is supported by various development platforms; and
   generating, based on the application program interface for rendering, the rendering code according to the target parameter information of the target image.

4. A non-transitory computer-readable storage medium having computer instructions therein, wherein the computer instructions are configured to cause a computer to implement the method of claim 1.

5. The storage medium of claim 4, wherein the computer instructions are configured to cause the computer further to implement operations of:
   normalizing the one or more target parameter information corresponding to the one or more rendering indexes respectively, so as to obtain a normalized parameter information corresponding to each of the one or more rendering indexes; and
   generating the rendering code according to the normalized parameter information corresponding to each of the one or more rendering indexes.

6. The storage medium of claim 4, wherein the computer instructions are configured to cause the computer further to implement operations of:
   determining an application program interface for rendering, wherein the application program interface is supported by various development platforms; and
   generating, based on the application program interface for rendering, the rendering code according to the target parameter information of the target image.

7. The method of claim 1, wherein only the rendering code is transmitted to the second electronic device from the first electronic device.

8. A method of rendering an image that is applied to a second electronic device, the method comprising:
   acquiring a rendering request, wherein the rendering request requests to render an image to be rendered;
   executing a rendering code in response to the rendering request, so as to render the image to be rendered;
   receiving a hot update request from a third electronic device; and
   transmitting the rendering code to the third electronic device in response to the hot update request,
   wherein the second electronic device is a cloud device, wherein the rendering code is obtained by a first electronic device by:
      acquiring a target image obtained by rendering an initial image, wherein the target image comprises one or more target parameter information corresponding to one or more rendering indexes respectively, the one or more rendering indexes comprises at least one of saturation, contrast, exposure, chroma, and texture, and the one or more rendering indexes corresponding to the texture is texture type; and
      generating the rendering code according to the target parameter information of the target image, and the rendering code comprises the one or more target parameter information corresponding to the one or more rendering indexes.

9. An electronic device, comprising:
   at least one processor; and
   a memory communicatively connected to the at least one processor, wherein the memory stores instructions executable by the at least one processor, and the instructions, when executed by the at least one processor, cause the at least one processor to implement the method of claim 8.

10. A non-transitory computer-readable storage medium having computer instructions therein, wherein the computer instructions are configured to cause a computer to implement the method of claim 8.

11. The method of claim 8, wherein only the rendering code is transmitted to the second electronic device from the first electronic device.

12. An electronic device, comprising:
- at least one processor; and
- a memory communicatively connected to the at least one processor, wherein the memory stores instructions executable by the at least one processor, and the instructions, when executed by the at least one processor, cause the at least one processor to implement the method of claim 1.

13. The electronic device of claim 12, wherein the instructions, when executed by the processor, cause the processor further to implement operations of:
- normalizing the one or more target parameter information corresponding to the one or more rendering indexes respectively, so as to obtain a normalized parameter information corresponding to each of the one or more rendering indexes; and
- generating the rendering code according to the normalized parameter information corresponding to each of the one or more rendering indexes.

14. The electronic device of claim 12, wherein the instructions, when executed by the processor, cause the processor further to implement an operations of:
- determining an application program interface for rendering, wherein the application program interface is supported by various development platforms; and
- generating, based on the application program interface for rendering, the rendering code according to the target parameter information of the target image.

* * * * *